US012602432B2

(12) United States Patent
Vallet Glenisson et al.

(10) Patent No.: US 12,602,432 B2
(45) Date of Patent: Apr. 14, 2026

(54) SUMMARY GENERATION FOR A DISTRIBUTED GRAPH DATABASE

(71) Applicant: DASSAULT SYSTEMES, Velizy Villacoublay (FR)

(72) Inventors: Eric Vallet Glenisson, Vélizy-Villacoublay (FR); Alexandra Deniaud, Vélizy-Villacoublay (FR); Frédéric Labbate, Vélizy-Villacoublay (FR); Alban Roullier, Vélizy-Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 0 days.

(21) Appl. No.: 18/531,262

(22) Filed: Dec. 6, 2023

(65) Prior Publication Data

US 2024/0184827 A1 Jun. 6, 2024

(30) Foreign Application Priority Data

Dec. 6, 2022 (EP) .................................... 22306798

(51) Int. Cl.
*G06F 7/00* (2006.01)
*G06F 16/2458* (2019.01)
*G06F 16/901* (2019.01)

(52) U.S. Cl.
CPC ...... *G06F 16/9024* (2019.01); *G06F 16/2471* (2019.01)

(58) Field of Classification Search
CPC ............. G06F 16/9024; G06F 16/2471; G06F 16/2228; G06F 16/51; G06F 16/27; G06F 16/532
See application file for complete search history.

(56) References Cited

U.S. PATENT DOCUMENTS

| | | | | |
|---|---|---|---|---|
| 10,346,401 | B2 * | 7/2019 | Abolhassani | ..... G06F 16/24549 |
| 11,068,439 | B2 * | 7/2021 | Bicer | .................... G06F 16/116 |
| 12,072,918 | B1 * | 8/2024 | Newman | ................ G06N 3/045 |
| 2006/0235823 | A1 * | 10/2006 | Chong | ................ G06F 16/2455 |
| 2006/0235837 | A1 * | 10/2006 | Chong | ............. G06F 16/24534 |
| 2007/0226796 | A1 * | 9/2007 | Gilbert | .................. G06F 21/577 |
| | | | | 726/25 |
| 2008/0294644 | A1 * | 11/2008 | Liu | ......................... G06F 40/30 |
| 2009/0132474 | A1 * | 5/2009 | Ma | .................... G06F 16/24535 |

(Continued)

OTHER PUBLICATIONS

Compressed vertical partitioning for efficient RDF management; Sandra Álvarez-García, Nieves Brisaboa, Javier D. Fernández, Miguel A. Martínez-Prieto, Gonzalo Navarro, Apr. 1, 2013 (Year: 2013).*

(Continued)

*Primary Examiner* — Mohammed R Uddin
(74) *Attorney, Agent, or Firm* — Oblon, McClelland, Maier & Neustadt, L.L.P.

(57) ABSTRACT
A computer-implemented method for generating a summary of a graph database comprising a set of RDF tuples including obtaining the graph database and generating a summary having a set of probabilistic filters. Each probabilistic filter of the set determines if at least one RDF tuple existing in the graph database corresponds to a respective basic graph pattern of the probabilistic filter with a possibility of false positive.

19 Claims, 4 Drawing Sheets obtaining the graph database

S10 generating a summary comprising a set of probabilistic filters, each probabilistic filter of the set determining if at least one RDF tuple existing in the graph database corresponds to a respective basic graph pattern of the probabilistic filter with a possibility of false positive

S20

(56) References Cited

U.S. PATENT DOCUMENTS

| | | | | |
|---|---|---|---|---|
| 2011/0225167 | A1* | 9/2011 | Bhattacharjee | G06F 16/284 |
| | | | | 711/E12.001 |
| 2012/0047124 | A1* | 2/2012 | Duan | G06F 16/24534 |
| | | | | 707/713 |
| 2012/0136875 | A1* | 5/2012 | Pan | G06F 16/953 |
| | | | | 707/E17.014 |
| 2012/0303668 | A1* | 11/2012 | Srinivasan | G06F 16/288 |
| | | | | 707/792 |
| 2014/0143281 | A1* | 5/2014 | Duan | G06F 16/211 |
| | | | | 707/798 |
| 2014/0379755 | A1* | 12/2014 | Kuriakose | G06F 16/24522 |
| | | | | 707/780 |
| 2016/0162549 | A1* | 6/2016 | Duan | G06F 16/9024 |
| | | | | 707/719 |
| 2017/0098009 | A1* | 4/2017 | Srinivasan | G06F 16/9024 |
| 2018/0137155 | A1* | 5/2018 | Majumdar | G06F 16/2228 |
| 2019/0317961 | A1 | 10/2019 | Brener et al. | |
| 2020/0073932 | A1* | 3/2020 | Jia | G06F 16/9024 |
| 2023/0073312 | A1* | 3/2023 | Portisch | G06F 16/258 |

OTHER PUBLICATIONS

Efficient Query Answering in Probabilistic RDF Graphs, Xiang Lian and Lei Chen; Department of Computer Science and Engineering, The Hong Kong University of Science and Technology, Hong Kong, China; Jun. 12, 2011 (Year: 2011).*

Extended European Search Report issued May 8, 2023, in European Patent Application No. 22306798.4, 9 pages.

Cebiric, S., et al., "Summarizing semantic graphs: a survey", The VLDB journal, vol. 28, No. 3, 2019, p. 295-327 (abstract only).

Hose, K, et al., "Towards benefit-based RDF source selection for SPARQL queries", In Proceedings of the 4th International Workshop on Semantic Web Information Management. 2012, p. 1-8.

Stefanoni, G., et al., "Estimating the cardinality of conjunctive queries over RDF data using graph summarization", In Proceedings of the 2018 World Wide Web Conference, 2018, p. 1043-1052.

Zouaghi, I., et al., "Query optimization for large scale clustered RDF data", In: DOLAP, 2020, p. 56-65.

Peng, P., et al., "Processing SPARQL queries over distributed RDF graphs", The VLDB Journal, vol. 25, No. 2, 2016, p. 243-268.

Alvarez-García, S., "Compressed vertical partitioning for efficient RDF management", Knowledge and Information Systems, vol. 44, No. 2, 2015, p. 439-474.

"RDF Dumps", Microsoft Academic Knowledge Graph, Retrieved May 10, 2022, from https://makg.org/rdf-dumps, 5 total pages.

"RDF 1.1 Concepts and Abstract Syntax", W3C Recommendation Feb. 25, 2014, 20 total pages.

"Bloom filter", https://en.wikipedia.org/wiki/Bloom_filter, 2023, 25 total pages.

"Hash function", https://en.wikipedia.org/wiki/Hash_function, 2023, 15 total pages.

"Salt (cryptography)", https://en.wikipedia.org/wiki/Salt_(cryptography) graphy), 2023, 3 total pages.

Ali, W., et al., "A Survey of RDF Stores & SPARQL Engines for Querying Knowledge Graphs", The VLDB Journal, vol. 31, 2021, p. 1-26.

Katib, A., et al., "RIQ: Fast processing of SPARQL queries on RDF quadruples", J. Web Semant. 37-38, 2016, p. 90-111.

Haque, A., "A MapReduce Approach to NoSQL RDF Databases", ArXiv, abs/1601.01770, 2016, 78 total pages.

Slavov, V., et al., "Fast Processing of SPARQL Queries on RDF Quadruples", ArXiv abs/1506.01333, 2015, 7 total pages.

* cited by examiner obtaining the graph database

S10 generating a summary comprising a set of probabilistic filters, each probabilistic filter of the set determining if at least one RDF tuple existing in the graph database corresponds to a respective basic graph pattern of the probabilistic filter with a possibility of false positive

S20

Figure 4: A taxonomy of the works in the area.

SUMMARY GENERATION FOR A DISTRIBUTED GRAPH DATABASE

CROSS REFERENCE TO RELATED APPLICATIONS

This application claims priority under 35 U.S.C. § 119 or 365 European Application No. 22306798.4 filed Dec. 6, 2022. The entire contents of the above application are incorporated herein by reference.

TECHNICAL FIELD

The disclosure relates to the field of computer programs and systems, and more specifically to a method, system and program for generating a summary for graph database.

BACKGROUND

A number of systems and programs are offered on the market for the design, the engineering and the manufacturing of objects. CAD is an acronym for Computer-Aided Design, e.g., it relates to software solutions for designing an object. CAE is an acronym for Computer-Aided Engineering, e.g., it relates to software solutions for simulating the physical behavior of a future product. CAM is an acronym for Computer-Aided Manufacturing, e.g., it relates to software solutions for defining manufacturing processes and operations. In such computer-aided design systems, the graphical user interface plays an important role as regards the efficiency of the techniques. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. All together the system delivers an open object model linking products, processes, resources to enable dynamic, knowledge-based product creation and decision support that drives optimized product definition, manufacturing preparation, production and service.

Graph databases are particularly adapted for applications in In-memory databases, i.e., purpose-built databases that rely primarily on memory for data storage, in contrast to databases that store data on disk or SSDs. In general application, RDF graph databases need to be capable of handling large datasets of billions of tuples and in size of terabytes (e.g., Microsoft Academic Knowledge Graph. Retrieved May 10, 2022, from makg.org/rdf-dumps with over 8 billion triples requiring 1.2 TB of storage in the standard TTL format). In order to keep the performances and scalability of such large databases, distributed approaches in which data is stored across different physical locations are required. The distribution of data over the physical location may be so as to optimize some aspects of the database, or response to received queries (e.g., write or read). In general, such a distribution is not necessarily known or cannot be enforced. In general, and to address the optimization of query answering, methods in the prior art exploit summarization techniques of large databases as a representative surrogate in answering the queries.

Document HOSE, Katja et SCHENKEL, Ralf. "Towards benefit-based RDF source selection for SPARQL queries." In: *Proceedings of the 4th International Workshop on Semantic Web Information Management.* 2012. p. 1-8, proposes a sketch-based query routing strategy that takes source overlap into account. The proposed strategy uses sketches and can be tuned towards either retrieving as many results as possible for a given budget or minimizing the number of requests necessary to retrieve all or a certain fraction of the results.

Document STEFANONI, Giorgio, MOTIK, Boris, and KOSTYLEV, Egor V. "Estimating the cardinality of conjunctive queries over RDF data using graph summarization." In: *Proceedings of the* 2018 *World Wide Web Conference.* 2018. p. 1043-1052, discloses a principled cardinality estimation technique based on graph summarization. The technique interprets a summary of an RDF graph using a possible world semantics and formalize the estimation problem as computing the expected cardinality over all RDF graphs represented by the summary.

Document ZOUAGHI, Ishaq, MESMOUDI, Amin, GALICIA, Jorge, et al. "Query optimization for large scale clustered RDF data." In: *DOLAP.* 2020. p. 56-65, proposes logical structures generically depicting graph-based query execution. The document defines statistics collected for clusters of triples to better capture the dependencies found in the original graph, and redefines an execution plan based on these logical structures. The document introduces an algorithm for selecting the optimal execution plan based on a customized cost model.

The above-cited methods have limited scalability or are not adapted to be applied on distributed graph databases. Within this context, there is still a need for an improved method for generating a summary of a graph database comprising a set of RDF tuples.

SUMMARY

It is therefore provided a computer-implemented method for generating a summary of a graph database comprising a set of RDF tuples, the method comprising obtaining the graph database, and generating a summary comprising a set of probabilistic filters. Each probabilistic filter of the set determines if at least one RDF tuple existing in the graph database corresponds to a respective basic graph pattern of the probabilistic filter with a possibility of false positive.

The method may comprise one or more of the following:
- the set of probabilistic filters comprises, for each predicate of the set of RDF tuples a first filter corresponding to a first basic graph pattern which comprises the predicate and any subject in the set of RDF tuples, and/or a second filter corresponding to a second basic graph pattern which comprises the predicate and any object in the set of RDF tuples;
- the set of probabilistic filters comprises for each predicate of the set of RDF tuples, a third filter corresponding to a third basic graph pattern which comprises the predicate and any subject and/or object in the set of RDF tuples, preferably said subjects and/or objects are of type of URI;
- the set of probabilistic filters comprises for each non-URI type of respective objects in the graph database, a fourth filter corresponding to a fourth basic graph pattern which comprises said respective objects;

the set of probabilistic filters comprises a fifth filter corresponding to a fifth basic graph pattern which comprises a blank node as subject;

the summary further comprises a value indicating the respective number of RDF tuples in the graph database for each predicate, and/or metadata defining a role for each probabilistic filter of the set;

each probabilistic filter of the set comprises an array of a first size, and one or more hash functions, and wherein each probabilistic filter is configured to determine if at least one RDF tuple existing in the graph database corresponds to the respective basic graph pattern of the probabilistic filter by inputting each RDF tuple of the graph database to each hash function of the probabilistic filter to obtain a respective output of a second size, and storing the respective output in the array;

the number of the one or more hash functions is based on the second size, preferably proportional to the second size, wherein more preferably the second size is between 10 to 18 bits, and even more preferably the second size is 15 bits;

the number of the one or more hash functions is based on the second size, preferably proportional to the second size, wherein more preferably the second size is between 10 to 18 bits, and even more preferably the second size is 15 bits; and/or the graph database is a partitioned graph database comprising a set of partitions, and the generating further comprises generating a summary for each partition of the partitioned graph database.

It is further provided a computer-implemented method of using (or of use of) a set of summaries of a partitioned graph database generated by the method for generating a summary of a graph database discussed above. The method of using comprises obtaining the partitioned graph database and the generated set of summaries of the partitioned graph database, and receiving by the partitioned graph database a query comprising one or more basic graph patterns. The method of using further comprises, for each basic graph pattern, identifying one or more partitions of the set of partitions based on the generated set of summaries, wherein the one or more partitions comprise all RDF tuples of the obtained partitioned graph database that answer the query, and executing the received query on the identified one or more partitions of the set.

The method of using may comprise one or more of the following:

the identifying of one or more partitions of the set of partitions based on the generated set of summaries comprises for each summary of the generated set of summaries, determining, by each filter of the set of probabilistic filters of the summary, if at least one RDF tuple existing in the partition of the summary corresponds to the respective basic graph pattern of the probabilistic filter; and/or further comprising, after identifying one or more partitions and prior to executing the received query on the identified one or more partitions of the set, determining whether or not, for a basic graph pattern of the set of basic graph patterns, the identified one or more partitions form an empty set; and optimizing a respective query plan of the received query by removing the basic graph pattern from the set of basic graph patterns when the identified one or more partitions form an empty set.

It is further provided a computer program comprising instructions for performing the above method and/or the above method of use.

It is further provided a computer readable storage medium having recorded thereon the computer program.

It is further provided a system comprising a processor coupled to a memory, the memory having recorded thereon the computer program.

BRIEF DESCRIPTION OF THE DRAWINGS

Non-limiting examples will now be described in reference to the accompanying drawings, where.

DETAILED DESCRIPTION

Figure 1:
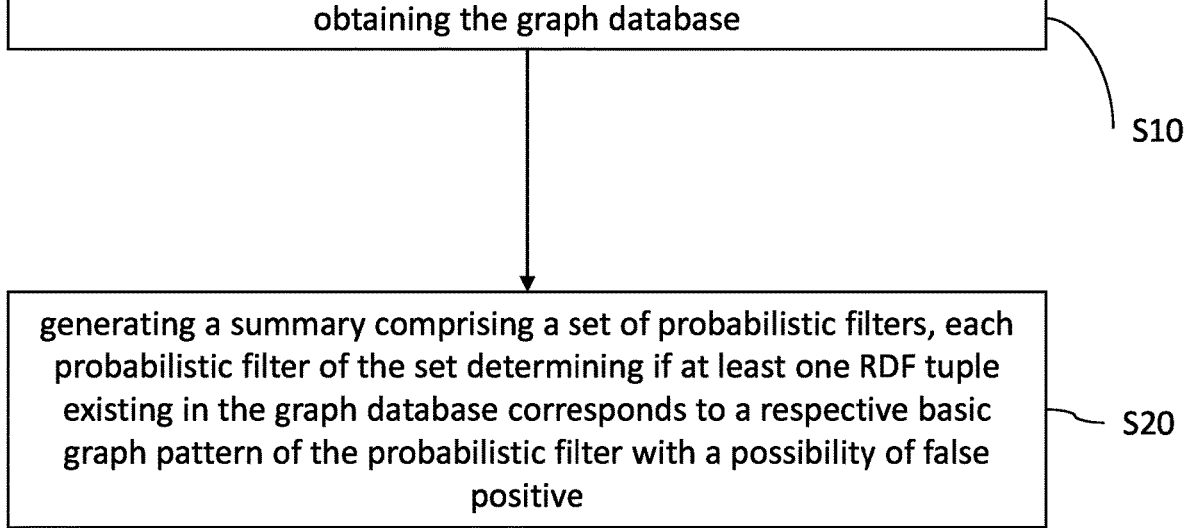
FIG. 1 shows a flowchart of an example of the method.

With reference to the flowchart of FIG. 1, it is proposed a computer-implemented method for generating a summary of a graph database comprising a set of RDF tuples. The method comprises obtaining the graph database, and generating a summary comprising a set of probabilistic filters. Each probabilistic filter of the set determines if at least one RDF tuple existing in the graph database corresponds to a respective basic graph pattern of the probabilistic filter with a possibility of false positive.

As known per se, by a "summary of a graph database" it is meant an extract of information of the graph database which is of a reduced size compared to the database. Such a summary may be in form of a graph of a smaller size of the graph database. Summarization of a graph database (i.e., providing a summary of a graph database) provides an efficient solution to access the database by a query engine, for example, to improve the speed and I/O cost of answering a query on the database. Such an improvement relies on the fact a summary of a graph database enables to partially browsing the information stored in a database by looking up into a smaller summary of said database. The summarization of a database may vary according to applications of said databases a priori or during the deployment of the database by varying the extract of information stored in the summary.

By the "possibility of false positive" it is meant the possibility of false positive of determining if at least one RDF tuple existing in the graph database corresponds to a respective basic graph pattern. In other words, the method may incorrectly determine that at least one RDF tuple existing in the graph database corresponds to a respective basic graph pattern of the probabilistic filter. In contrary, the method may not incorrectly determine that there is no one RDF tuple existing in the graph database that corresponds to a respective basic graph pattern of the probabilistic filter, i.e., the determining does not pertain the possibility of false negative.

Such a method constitutes an improved solution for generating a summary of a graph database comprising a set of RDF tuples. The method obtains such an improved solution by generating a summary of the graph database comprising a set of probabilistic filters. Such a set of probabilistic filters provides a scalable summary of the large databases with significantly smaller sizes without the need to impose any standard structure (i.e., schema) of the graph database. Consequently, since each set of probabilistic filters can be generated only regarding the RDF tuples existing in the graph database and if they correspond to a respective basic graph pattern of the probabilistic filter, the method can be applied on a distributed graph database without having been provided any information of the partitioning of the distributed database. By a "distributed database" it is meant a database in which data is stored across different physical locations (i.e., in different partitions), for example by system administrators.

Notably, the method provides an optimization in answering queries on the graph database by a query engine as the generated summary is capable of determining with the possibility of false positive if at least one RDF tuple existing in the graph database corresponds to a respective basic graph pattern of the probabilistic filter. In other words, as the summary excludes the possibility of false negative in the determining, the method improves query answering by removing the necessity to perform a query (or a basic graph pattern corresponding thereof) on an RDF graph database if the summary of said database indicates that there does not exist at least one RDF tuple in said graph database corresponding to a respective basic graph pattern of each probabilistic filter of the set. This is in particular beneficial as exploiting the generated summaries by a query engine in answering a query leads to a significant reduction (or elimination in some cases) of unnecessary accesses to the databases for the query. By an "unnecessary access for a query" it is meant an access which do not contribute to answer said query. Such unnecessary accesses may be in particular significant in case of distributed (graph) databases where respective data for answering a query does not exist in one or more physical storage locations (or equivalently partitions) thereby querying said physical storage locations does not contribute to answer said query.

By "database" it is meant any collection of data (i.e., information) organized for search and retrieval (e.g., a graph-oriented database). As known in the art, a graph-oriented database, is an object-oriented database using graph theory, therefore with nodes and arcs, allowing data to be represented and stored. The graph relates the data items in the store to a collection of nodes and edges, the edges representing the relationships between the nodes. The relationships allow data in the store to be linked together directly and, in many cases, retrieved with one operation. Graph databases hold the relationships between data as a priority; contrarily to other database models (e.g., relational databases) that link the data by implicit connections. When stored on a memory, the graph database allows a rapid search and retrieval by a computer. Especially, graph databases are structured to for fast retrieval, modification, and deletion of relationships in conjunction with various data-processing operations. Graph-oriented database are also referred to as graph database; the expressions "graph-oriented database" and "graph database" are synonymous.

In examples, the graph database may be an RDF graph database. RDF graphs are a traditional data model used for the storage and the retrieving of graphs. RDF graph is a directed, labeled graph data format. Such format is widely used for representing information in the Web. A standard specification has been published by W3C to specify RDF representation of information as graphs, see for example "RDF 1.1 Concepts and Abstract Syntax", W3C Recommendation 25 Feb. 2014 (or additionally the draft version RDF-star). An RDF graph database may have billions of tuples; for example the Uniprot dataset is a resource of protein sequence and functional information.

The core structure of the abstract syntax used is a set of tuples, each comprising a predicate. A set of such RDF tuples is called an RDF graph.

In examples, an RDF tuple may comprise three or four elements comprising nodes and edges. In examples, each RDF tuple (or elements of each RDF tuple) may be a triple comprising a subject, a predicate, and an object. In such examples, an RDF graph may be visualized as a node and a directed-arc diagram, in which each triple is represented as a node-arc-node link. Alternatively, an RDF triple may be visualized by two nodes, which are the subject and the object and an arc connecting them, which is the predicate.

In examples, the RDF tuple may be an RDF quad. An RDF quad may be obtained by adding a graph label to an RDF triple. In such examples, an RDF tuple includes the RDF graph. A standard specification has been published by W3C to specify RDF Quads (also referred to as N-Quads), see for example "RDF 1.1 N-Quads, A line-based syntax for RDF datasets", W3C Recommendation 25 Feb. 2014. An RDF quad may be obtained by adding a graph name to an RDF triple. A graph name may be either empty (i.e., for a default or unnamed graph) or an IRI (e.g., a predicate). The graph name of each quad is the graph that the quad is part of in the dataset. Hereinafter, the term RDF tuple (or tuple) indifferently refers to an RDF triple or an RDF quad, unless the use of one or the other is explicitly mentioned.

Possible optimizations for a query engine of a graph database are impacted by the assumption that the graph database is interacting with an Open World or a Closed World. As known per se, in a formal system of logic used for knowledge representation, the open-world assumption (OWA) is the assumption that the truth value of a statement may be true irrespective of whether or not it is known to be true. It is the opposite of the closed-world assumption, which holds that any statement that is true is also known to be true. On the other hand, Closed World Systems require a place to put everything (e.g., slot on a frame, field on an OO class, or column in a DB). OWA assumes incomplete information by default which intentionally underspecifies and allows others to reuse and extend. Semantic Web is a vision of a computer-understandable web which is distributed knowledge and data in a reusable form and RDF, the W3C recommendation for the Semantic Web, follows the Open World Assumption. It allows a greater flexibility in data modeling and data storage. Yet the constraints of a Closed World Assumption, as in the relational model with SQL, are useful for query optimizations since they provide more information on how the data is stored. In examples, the query is a SPARQL query. SPARQL is the W3C recommendation for querying RDF data and is a graph-matching language built on top of triple patterns of RDF triples. SPARQL is a query language for RDF data able to express queries across diverse data sources, whether the data is stored natively as RDF or viewed as RDF via middleware. SPARQL is mainly based on graph homomorphism. A graph homomorphism is a mapping between two graphs that respects their structure. More concretely, it is a function between the vertex sets of two graphs that maps adjacent vertices to adjacent vertices.

SPARQL contains capabilities for querying required and optional graph patterns along with their conjunctions and disjunctions. SPARQL also supports aggregation, subqueries, negation, creating values by expressions, extensible value testing, and constraining queries by source RDF graph. By the triple pattern of RDF triples it is meant RDF triples in which each subject, predicate, or object may be a variable (of query). This means SPARQL queries needs to answer to eight different triple patterns possible in the SPARQL. Such eight triple patterns include (S,P,O), (S,?P, O), (S,P,?O), (S,?P,?O), (?S,P,O), (?S,?P,O), (?S,P,?O), and (?S,?P,?O) in which variables are preceded in the pattern, by the symbol ?. Variables are the output of triple patterns and may be the output of the SPARQL query. In some examples, variables may be the output of a SELECT query. The output of a SPARQL query may be built using the variables (e.g., aggregators like summation). Variables in a query may be used to build a graph homomorphism (i.e., intermediary nodes necessary to get the result of the query). In some examples, variables in a query may be neither used for output nor intermediary result. A Basic Graph Pattern (BGP) may be one of the eight triple patterns. SPARQL may build more complex queries by joining the result of several BGPs and possibly other operators. Thus, competitive SPARQL engines require, at least, fast triple pattern solution and efficient join methods. Additionally, query optimizers are required to build efficient execution plans that minimize the number of intermediate results to be joined in the BGP.

In examples, the graph database has an existing triple store. A triple store (also referred to as RDF store) is a purpose-built database for the storage and retrieval of triples through semantic queries, as known in the art. A triple store can at least answer to the eight basic triple patterns of SPARQL described above. It may also answer to filtering constraints (e.g., "x>5") along with the triples pattern. Such a triple store is considered to be the storage engine on which a SPARQL query is executed by a query engine. A storage engine (also called "database engine") is an underlying software component that a database management system (DBMS) uses to Create, Read, Update and Delete (CRUD) data from a database, as known in the art. Additionally, in examples, the triple store is a distributed database.

Back to FIG. 1, in step S10, the method comprises obtaining database. By "obtaining a graph database" it is meant providing the database to the method. In examples, such an obtaining or providing may mean or comprise either downloading said the database (e.g., from an online database, or an online cloud), or retrieving the database from a memory (e.g., a persistent memory).

In step S20, the method comprises generating a summary which comprising a set of probabilistic filters. By a "probabilistic filter" for a database it is meant a statistical indicator which determines a probability for an entity or a pattern (e.g., an RDF graph pattern) to exists in the database. As discussed above, each probabilistic filter of the set determines if at least one RDF tuple existing in the graph database corresponds to a respective basic graph pattern of the probabilistic filter with a possibility of false positive. Thereby, by "a respective basic graph pattern of the probabilistic filter" it is meant the pattern for which the probabilistic filter determines the probability of presence in the database. In other words, each probabilistic filter of the set if configured to or correspond to a basic graph pattern to determine its presence in the dataset. The basic graph pattern (or BGP) may be one of the eight triple patterns as discussed above.

In examples, the set of probabilistic filters comprises, for each predicate of the set of RDF tuples (of the database), a first filter corresponding to a first basic graph pattern which comprises the predicate and any subject in the set of RDF tuples. In other words, the first filter in the set is configured to return triples of the RDF graph database with a known subject and a known predicate for all predicates of the set of RDF tuples, or equivalently performing a query corresponding to a basic graph pattern of the form (S, P, ?O) for all predicates or Ps. Additionally or alternatively, the set of probabilistic filters may comprise, for each predicate of the set of RDF tuples (of the database), a second filter corresponding to a second basic graph pattern which comprises the predicate and any object in the set of RDF tuples. In other words, the second filter in the set is configured to return triples of the RDF graph database with a known object and a known predicate for all predicates of the set of RDF tuples, or equivalently to perform a query corresponding to a basic graph pattern of the form (?S, P, O) for all predicates or Ps.

In examples which are combinable with any of the examples discussed above, the set of probabilistic filters comprises, for each predicate of the set of RDF tuples, a third filter corresponding to a third basic graph pattern which comprises the predicate and any subject and/or object in the set of RDF tuples. In such examples, the third filter in the set is configured to return triples of the RDF graph database with a known predicate for all predicates of the set of RDF tuples, or equivalently to perform a query corresponding to a basic graph pattern of the form (?S, P, ?O) for all predicates or Ps. In preferred examples, the third filter is configured to return such triples when said subjects and/or objects are of type of URI.

In examples which are combinable with any of the examples discussed above, the set of probabilistic filters may comprise, for each non-URI type of respective objects in the graph database, a fourth filter which corresponds to a fourth basic graph pattern. The fourth basic graph pattern may comprise said respective (i.e., non-URI) objects. In other words, the fourth filter in the set is configured to perform a query corresponding to a basic graph pattern of the form (?S, ?P, O) where the object O is not of URI type (i.e., object O is of a literal type).

In examples which are combinable with any of the examples discussed above, the set of probabilistic filters may comprise a fifth filter corresponding to a fifth basic graph. The fifth basic graph pattern comprises a blank node as subject. As known per se, in RDF, a blank node (also called bnode) is a node in an RDF graph representing a resource for which a URI or literal is not given and can only be used as subject or object of an RDF triple (according to the RDF standard). In other words, the fifth filter in the set is configured to perform a query corresponding toto a basic graph pattern of the form (S, ?P, ?O) when S is a blank node.

In examples, the (generated) summary may further comprise a value indicating the respective number of RDF tuples in the graph database for each predicate. Such a value constitutes an improved solution by reducing the number of unnecessary accesses to the database in case that there is no predicate related to the query. For example, if the pattern of the query is of the shape (?S,P,?O), then the query engine may read the value representing the number of triples of predicate P of the summary and avoids an access to the database if the value is zero, i.e., when there is not any triple comprising the predicate P in the database. Such a value may be stored in a metadata part of the summary as discussed hereinbelow.

Such a value improves the method by providing an additional summary of existing predicated in the database. Such an additional summary may be further used to adapt the set of filters. For example, the method may add a filter to the set of filters for predicates with a large number of triples, for example for predicates with the number of triples larger than a threshold (e.g., larger then 5, 10, or 20 percent of a total number of triples in the database). In other words, the set of filters may be adapted to comprise a Bloom filter for rdf:type.

In examples, which are combinable with any of the examples discussed above, the summary may further comprise metadata (or equivalently statistics) defining a role for each probabilistic filter of the set and/or a size of the database. This constitutes an improved solution in optimization of query answering by reducing the number of unnecessary accesses to partitions. Such a reduction is achieved since the method may avoid an access to the database if the size of the metadata is small (e.g., smaller than a threshold). The metadata may comprise data referring to a location of each probabilistic filter of the set in a memory. Alternatively or additionally, the metadata may comprise information regarding the database, for example, a version, a number of predicates in the summary, and/or a number of (data) types in the summary. Yet alternatively or additionally, the metadata may comprise, for (data)types that support a comparison operator, a respective minimum and a respective maximum value of a datatype in the database. Such respective minimum/maximum value(s) allow further filtering and thereby further reduction of unnecessary access to the database. The method may achieve such a further filtering when the query engine uses the predicate metadata to find a respective minimum and maximum values of the object on the database (for objects whose type of support comparison operators) thus enables the method to avoid an unnecessary access to the database if the value of the object in not in a range defined by the respective minimum and the respective maximum.

In examples, each probabilistic filter of the set may comprise an array of a first size, and one or more hash functions. Each probabilistic filter is configured to determine if at least one RDF tuple existing in the graph database corresponds to the respective basic graph pattern of the probabilistic filter. Each probabilistic filter performs such a determination by inputting each RDF tuple of the graph database to each hash function of the probabilistic filter to obtain a respective output of a second size, and storing the respective output in the array. In examples, the second size is smaller or equal to the first size, thereby the method constitutes an efficient generated summary in terms of required storage.

In examples, the number of the one or more hash functions is based on the second size. In some preferred examples, the number of the number of the one or more hash functions is proportional to the second size. In some more preferred examples, the second size is between 10 to 18 bits, and even more preferably the second size is 15 bits.

In examples, the (generated) summary may comprise a filter buffer, and a position array. The filter buffer may comprise a concatenation of the set of filters, and the position array may comprise a respective position for each filter in the filter buffer. In examples, the position array may part of the metadata of the summary as discussed above.

In examples, at least one filter of the set of filters is of Bloom type. As known per se a Bloom filter is a space-efficient probabilistic data structure, which is used to test whether an element is a member of a set. The Bloom filters may provide false positive matches (as the result of the test), but false negatives are impossible.

In examples, the graph database may be a partitioned graph database comprising a set of partitions. In such examples, the generating of the summary may further comprise generating a summary for each partition of the partitioned graph database. In such examples, each summary of the set comprises a set of probabilistic filters, while each filter of the set is configured to determine if at least one RDF tuple existing in the partition corresponds to a basic graph pattern with a possibility of false positive. As discussed above, a partitioned databased may be equivalently referred to as a distributed database and each partition of a partitioned database may be stored in a different physical address.

It is also provided a computer-implemented method of using a set of summaries of a partitioned graph database generated by as discussed above. Such a method of using comprises obtaining the partitioned graph database and the generated set of summaries of the partitioned graph database, and receiving by the partitioned graph database a query comprising one or more basic graph patterns. The obtaining the partitioned graph database and the generated set of summaries of the partitioned graph database is performed according to the method of generating discussed above. The method of using further comprises, for each basic graph pattern, identifying one or more partitions of the set of partitions based on the generated set of summaries, wherein the one or more partitions comprise all RDF tuples of the obtained partitioned graph database that answer the query, and executing the received query on the identified one or more partitions of the set.

In examples, the identifying of one or more partitions of the set of partitions based on the generated set of summaries may comprise, for each summary of the generated set of summaries, determining, by each filter of the set of probabilistic filters of the summary, if at least one RDF tuple (e.g., triple) existing in the partition of the summary corresponds to the respective basic graph pattern of the probabilistic filter.

In examples, the method of using may further comprise, after identifying one or more partitions and prior to executing the received query on the identified one or more partitions of the set, determining whether or not, for a basic graph pattern of the set of basic graph patterns, the identified one or more partitions form an empty set. In examples, after said determining the method of using may further comprise optimizing a respective query plan of the received query by removing the basic graph pattern from the set of basic graph patterns when the identified one or more partitions form an empty set. In such examples, the basic graph pattern may be of type of (?S,P,O), (S,P,?O) and/or (?S,P,?O) or any combination of these types.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g., one for the program, and possibly one for the database).

Figure 4:
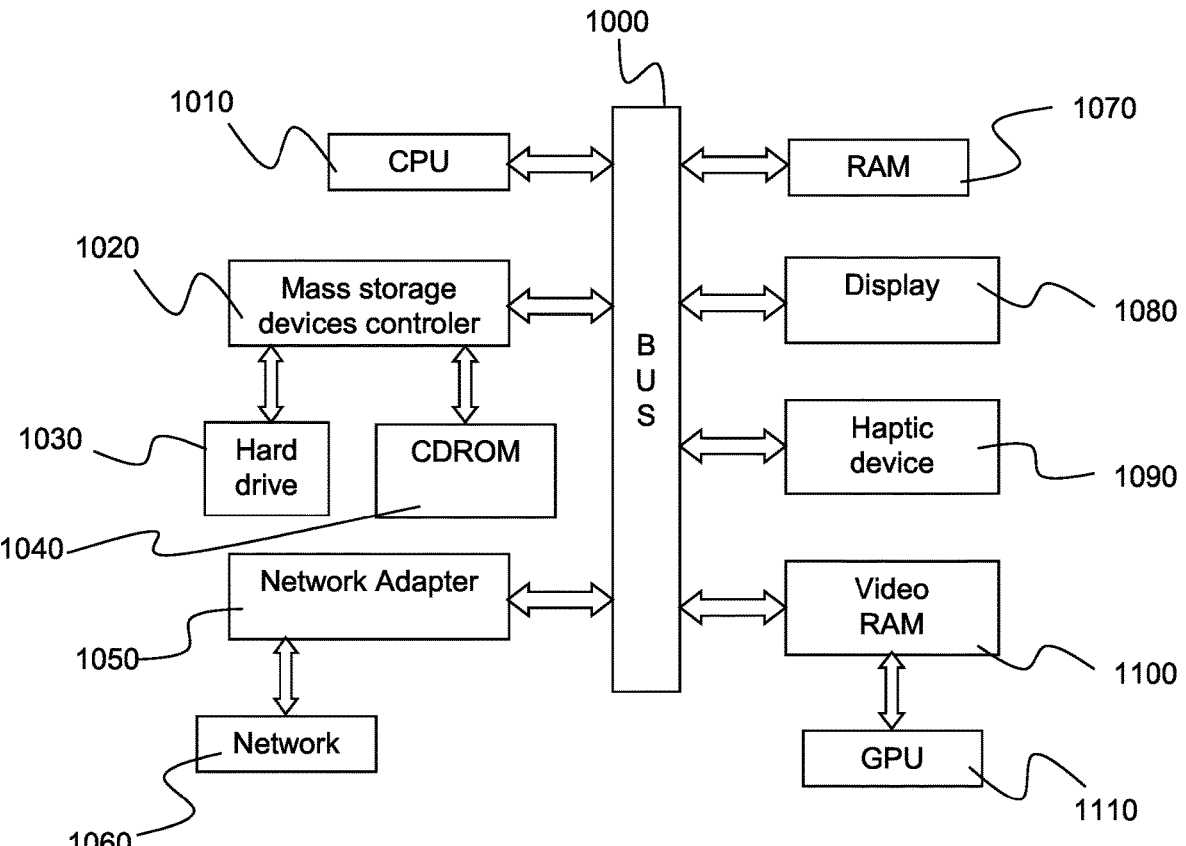
FIG. 4 shows an example of the system.

FIG. 4 shows an example of the system, wherein the system is a client computer system, e.g., a workstation of a user.

The client computer of the example comprises a central processing unit (CPU) 1010 connected to an internal communication BUS 1000, a random-access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method. The computer program may alternatively be stored and executed on a server of a cloud computing environment, the server being in communication across a network with one or more clients. In such a case a processing unit executes the instructions comprised by the program, thereby causing the method to be performed on the cloud computing environment.

Examples of implementations of the hereinabove discussed examples of the method are now discussed.

The examples of the implementations are related to RDF inMemory database which needs to be able to handle very large datasets. Such scalability requirements make the development of a distributed database necessary. Such examples are also related to distributed databases, in order to satisfy flexibility and performance needs specific to distributed databases with unknown partitioning schemes.

RDF is the W3C standard to represent knowledge graphs. Knowledge graphs can have billions of triples (e.g., MAG, Uniprot). The explosion in the amount of the available RDF data justifies the need to explore, query and understand such data sources. Due to the complex structure of RDF graphs and their heterogeneity, the exploration and understanding tasks are significantly harder than in relational databases, where the schema can serve as a first step toward understanding the structure. Summarization has been applied to RDF data to facilitate these tasks. Its purpose is to extract concise and meaningful information from RDF knowledge bases, representing their content as faithfully as possible. The summary of a RDF graph can have many applications as known in the field, for example in indexing, estimating the size of query results, making BGPs more specific, source selection, graph visualization, vocabulary usage analysis, and/or schema (or ontology) discovery.

Particular examples of the implementations are relation to the application of RDF graphs summaries to the optimization of a SPARQL query over a distributed RDF database. A distributed database is a database in which data is stored across different physical locations. In such databases, the data may be stored in multiple computers located in the same physical location (e.g., a data center); or maybe dispersed over a network of interconnected computers. Furthermore, optimizing a SPARQL query over a distributed RDF database by using RDF graph summaries means finding which physical location, also named "partition", holds (or may hold) the data needed to answer the query, and optimize the query plan to minimize the number of partitions queried and minimize the number of intermediate results fetched over the network.

In the implementations, the distributed RDF database has an unknown partitioning scheme of the data, and such partitioning is not enforced. In examples of the implementations, such a schema may be known but is chosen to optimize another aspect of the database, for example the write throughput (other than optimizing a query over the distributed RDF database). Additionally, the implementations do not consider an assumption on the content of the graph. In other words, the graph database may or may not have an associated ontology (or "schema"). In examples of the implementations where the graph database has some implicit triples (i.e., the triples obtained by application of inference on the database) the graph is saturated (i.e., all triples are concretized). In the implementations, the distributed RDF database, once deployed, is read-only. Furthermore, in the implementations, the query language for RDF is called SPARQL which is mainly based on graph homomorphism as discussed above.

Figure 2:
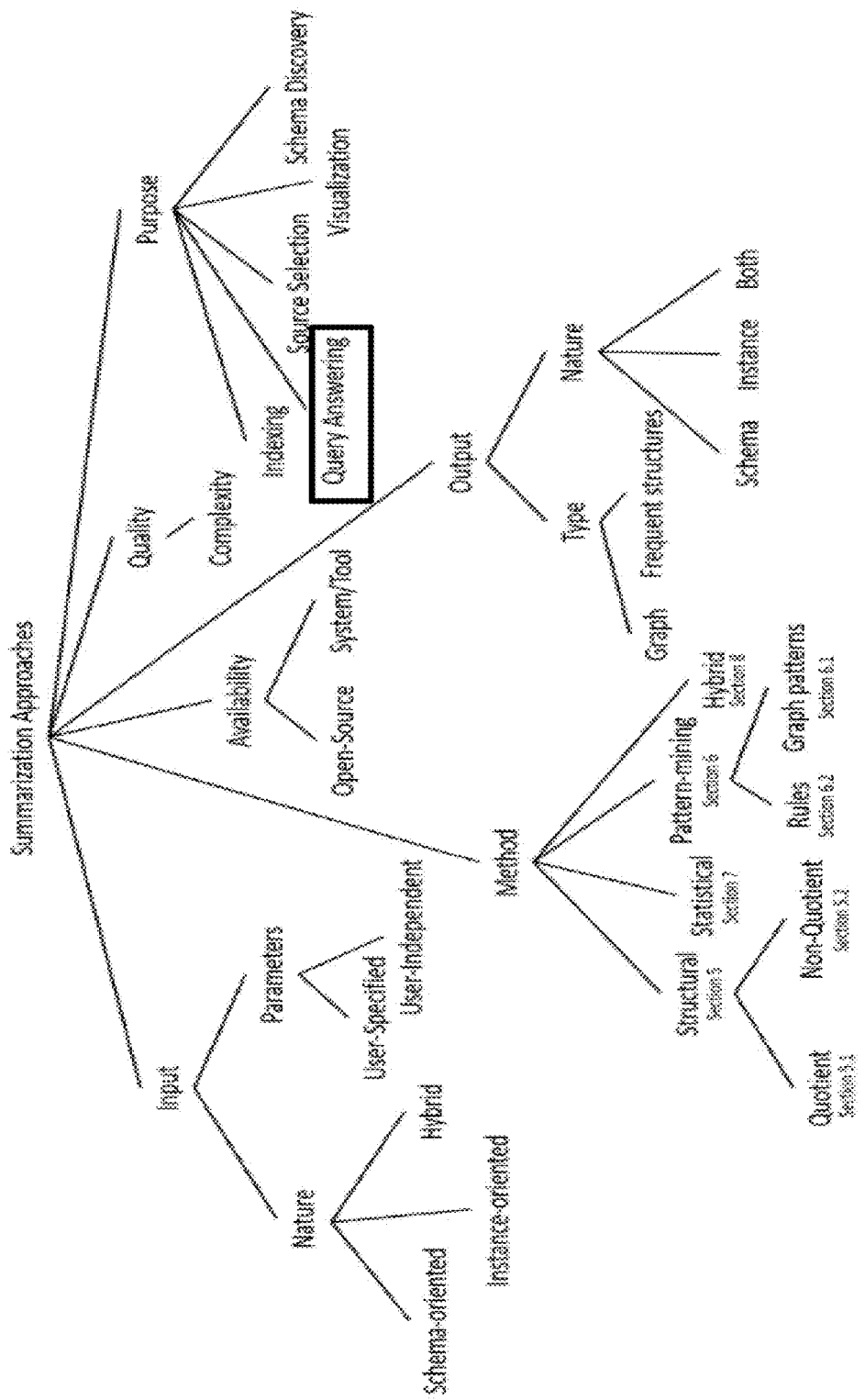
FIG. 2 shows a taxonomy of the prior art in summarization approaches.

The implementations are more related to the field of graph summary in the optimization of a query over a distributed RDF database. A taxonomy of works in this field is presented in FIG. 2. The implementations are in particular related to "query answering" in FIG. 2.

The different possible methods for query answering are:

Structural methods which aim at producing a summary graph, typically much smaller than the original graph, such that certain interesting properties of the original graph (connectivity, paths, certain graph patterns, frequent nodes etc.) are preserved in the summary graph. These properties are taken into consideration to construct a summary. Such methods heavily rely on ontology/schema of the database and are not well suited for graphs that may have very few or no structure at all. Furthermore, such methods are not generic enough and require high computation cost.

Pattern mining methods which extract the frequent patterns from the RDF graph, and use these patterns to represent the original RDF graph. A frequent pattern, usually referred to as a knowledge pattern in the RDF/OWL KB context, characterizes a set of instances in an RDF data graph that share a common set of types and a common set of properties. It is usually modeled as a star BGP. Such methods are not generic enough and require high computation cost.

Statistical summarization method which comprise quantitatively summarization of the contents of an RDF graph. Such methods are conceptually close to pattern mining; however, statistical summarization methods have the advantage over the pattern mining in not to be sensitive to issues of structural completeness of the summary which helps reducing computational cost.

Structural and pattern mining approaches have both the drawbacks of trying to adapt relational approaches not well-suited for a native graph database, or focusing on particular types of queries (e.g., star of chain queries). Thereby such methods are not scalable both in term of computation cost and of the diversity of data and query supported. The implementations are particularly related to the field of statistical summarization.

The implementations exploit Bloom filters (en.wikipedia.org/wiki/Bloom_filter) to decide if a partition may have data needed to answer the input query. Yet the Bloom filters perform this decision in the context of linked open data and use it as source selection and detection of overlap between sources. The Bloom filters are summaries of the results of a given query, thus requiring computing the query (which acts against purpose of query optimization). Such Bloom filters are not representatives of all the "source" which they are representing (e.g., a partition in a distributed database). Known applications of Bloom filters a seek to provide a solution for data integration problem between different databases. In other words, a summary comprised of Bloom filters provides a solution in executing queries that run on several databases with potentially different implementations (i.e., the implementation details of each database cannot be relied on and queries must be used to get any data) and when the databases may contain the same data (i.e., they are not partitions of a bigger database). However, the implementations provide an improved solution for execution of queries on a single database split into partitions.

The implementations seek to define a statistical graph summarization to optimize the number of partitions used in the execution of a distributed SPARQL query, without making any assumptions on the data distribution or on the shapes of the data or on the shape of the query. The summaries must ensure the scalability of the solution to very large amount of data (e.g., several billion triples) and its usage in a query engine optimizer (i.e., response time of a query on a summary around 10 milliseconds).

In order to define such a statistical summarization, the implementations use Bloom filters with a structure tied to the graph homomorphism nature of SPARQL to be as close as possible to the natural paradigm of the native SPARQL query engine (when some other approaches in the literature are optimized for relational query engines on top of which SPARQL queries are translated into SQL). The implementations also ensure the scalability of the approach by creating summaries with a size in the order of magnitude of 0.1% compared to the original dataset in TTL plain file format.

First, the implementations set apart the predicates (i.e., the different edge labels of the graph). Experiments have shown that the number of predicates is far lower than the number of subjects/objects (i.e., the number of nodes of the graph). This number is in the order of magnitude of 10K. Therefore, the implementations can efficiently filter out non-existing predicates in the memory of the cluster node issuing the SPARQL query.

The next question is to know if a given node (subject/object) may exist in a given partition. To limit the number of false positives in the Bloom Filter, the implementations have one Bloom Filter per RDF datatype (www.w3.org/TR/rdf11-concepts/#section-Datatypes). Experiments have shown that with this first step, the implementations reduce the size to be accessed below 10% of the original dataset on average, with a response time around 1 ms.

Once the potential existence of nodes is established, the implementations verify if a basic graph pattern has potential hits in a partition. To this end, the implementations add additional Bloom Filters to answer efficiently the eight basic graph patterns detailed above. Integrated in the native SPARQL query engine, this ensures that distributed SPARQL queries over a read-only distributed database of several billion triples request only the necessary partitions in the cluster, with an accepted false positive error of around 0.1%.

The implementations allow the query engine to eliminate most unnecessary partition accesses and work with any possible partitioning of the dataset. The implementations do not require any knowledge of how the dataset has been partitioned. Compared to solutions that try to discover patterns in the partitioning, the implementations do not require any pattern to be discoverable in the partitioning, and therefore is not dependent on the dataset. Moreover, since the implementations do not need to search for patterns but only to read the data of the partition once, the generation of the implementations are able to generate summaries simply and efficiently. The small size of a summary compared to the size of the partition (less than 0.1% of the original TTL dataset on average, and less than 10% of our most compact partition format in our current implementation) makes the solutions provided by the implementations scalable to very large datasets. Furthermore, fast read times (a typical read only requires the computation of around 10 hashes) allow the implementations to be used in a query optimizer or even a query executor.

Content of the Summary

The purpose of summaries in the implementations is to avoid unnecessary accesses to data partitions from the query engine. In a distributed system, partitions are expensive to access (their physical location may be over the network, which introduce a latency cost) and too large to be all entirely copied into local storage (basically, it is why the data is distributed in the first place). Instead, for each partition, the query engine creates and stores a much smaller summary (as discussed in section "size of the Bloom filters" hereinbelow) that indicates whether a piece of data has a chance of being present on corresponding partition.

The implementations provide a statistical method that can have false positive but no false negative. In other words, the answer (provided by summary) is either "certainly not" or "maybe". If a pattern is known to be absent from a partition, then the query engine does not try to access the partition when trying to obtain data corresponding to this pattern.

In practice, a summary is a file containing a set of Bloom filters and metadata that determines the role of each Bloom filter. A Bloom filter is a well-known probabilistic data structure (en.wikipedia.org/wiki/Bloom_filter) that uses hashing to determine whether some elements are part of a set. The Bloom filters have a probability of returning false positives, but use a lot less memory than the partition they summarize (as discussed in section "size of the Bloom filters" hereinbelow). The implementations exploit these Bloom filters to store locally and cheaply whether elements have a chance of being present in the partition corresponding to the summary.

The underlying structure of a Bloom filter is a simple array of bits, and its characteristics are the size of this array, the number of elements it contains, and the number of hash functions that are applied when adding an element or testing its presence. The two basic operations on a Bloom filter are to insert an element, and to query whether an element has previously been inserted into the Bloom filter.

As discussed above, the query by a Bloom filter may return a false positive (i.e., answer that the value has been added when it has not) but never a false negative. Given the size and number of entries of a Bloom filter, the number of hash functions may be chosen to ensure that the probability of false positives is below a chosen threshold.

In the implementations, given an RDF graph, a summary of the RDF graph contains:

"predicate" Bloom filters: for each predicate in this graph, the elements of the corresponding Bloom filter are every URI that is either a subject or an object of this predicate in the graph;

"object" Bloom filters: for each type except URIs, the elements of the corresponding Bloom filter are every literal of this type that is the object of any triple in the graph; and a "blank node subjects" Bloom filter, whose element are every blank node that is the subject of any triple in the graph. This is equivalent to the object Bloom filters, since the only non-URI type allowed for subjects is blank nodes; and the number of triples for each predicate in the graph.

Such a list of Bloom filters allows the query engine to query the summary for the presence of S,P,?O patterns or ? S,P,O patterns in the partition if S (respectively O) is an URI, and of for the presence of (?S,?P,O) (or respectively (S,?P, ?O)) otherwise.

In the implementations, other sets of Bloom filters are also possible, for example, a summary of a given RDF graph may split the Bloom filters by predicate for all subjects and objects rather than only URIs. These cases with larger number of Bloom filters require up more memory in exchange for better filtering performance. Furthermore, the summary may include specific Bloom filters for specific predicates that tend to have a large number of triples. In particular, the summary may have a specific Bloom filter for rdf:type. In such cases, the summary may have Bloom filters corresponding to more specific data patterns, for example a Bloom filter for all URIs that are simultaneously subject to two specific predicates, as an additional help to optimize queries of the shape {?s<P1>?o1; <P2>?o2}.

As a further optimization to reduce the number of accesses to partitions, the summary in the implementations may also contain additional metadata or statistics if their size (i.e., the size of the metadata or statistics) is small. For example, the implementations store, for types that support a comparison operator, the minimum and maximum value on the partition to allow some further filtering.

Using Summaries to Reduce Accesses to Partitions During Query Executions

The most basic usage of the implementations appears in query execution. The basic operation in SPARQL query execution is finding the triples that match a triple pattern which may be of the shape (S,P,O), (S,?P,O), (S,P,?O), (S,?P,?O), (?S,P,O), (?S,?P,O), (?S,P,?O), or (?S,?P,?O). Of these, the most frequent patterns are (?S,P,O), (S,P,?O) and (?S,P,?O).

In these three cases, the predicate is known, and in the two first cases, either the subject or the object is known. Thereby, the query engine according to the implementations keep a summary of each partition locally. Since the summary are much smaller than the partitions themselves, this is possible even though the partition is too big to fit into the same node.

Given a pattern of the shape (?S,P,O) where P and O are known, if O is an URI, then the query engine queries the predicate Bloom filter corresponding to P for each partition. Otherwise, the query engine queries the object Bloom filter corresponding to the type of O for each partition. Since a Bloom filter never gives false negatives, the query engine then knows that it only needs to query data from the partitions whose summary returned "true" to the queries. False positives may cause an unnecessary access to a partition.

Similarly, if the pattern is of the shape (S,P,?O), if S is an URI, the query engine queries the predicate Bloom filter for P. Otherwise, S can only be a blank node, and the query engine queries the "blank node subject" Bloom filter for each partition.

Finally, if the pattern is of the shape (?S,P,?O), then the query engine reads the number of triples of this predicate from the predicate metadata of the summary. If the number of triples is 0 for a partition, then the query engine does not need to access the partition at all.

Additionally, for objects whose type support comparison operators, the query engine can also use the predicate metadata to find the minimum and maximum values of the object on a partition. If the object does not fit in this range, the partition does not need to be read.

In practice, the query engine according to the implementations first generates a list of several patterns (for example, the default configuration is lists of up to 8192 patterns) and checks summaries for all of these patterns. If a summary is positive for at least one pattern, then the query engine queries the corresponding partition; otherwise, it ignores it. For small queries that need to traverse few triples in the database, this can suffice to eliminate most partition accesses. Larger queries still need to access many partitions if the data they need to read is unfavorably partitioned. However, the experiments have showed that even with large queries with unknown partitioning schemes, at least 25% of all partition accesses are eliminated.

According to the implementations, a summary may be used in other ways to reduce the number of accesses to the partitions, and the usage is not restricted to what has been described in this section.

Using Summaries to Improve Query Optimization

The implementations may also use summaries before query execution in order to improve query optimization. In other words, during query compilation, if the query contains a pattern (?S,P,O) (where P and O are known at compile time and not just at execution time), the query engine may query the summaries for every partition corresponding to this pattern. If every summary query returns false, then the pattern does not exist on any partition and can be completely eliminated from the query. Similarly, the implementations may check (S,P,?O) and (?S,P,?O) patterns.

According to the implementations, a summary can be used in other ways to optimize a query and the usage is not restricted to what has been described in this section.

Size of the Bloom Filters

Figure 3:
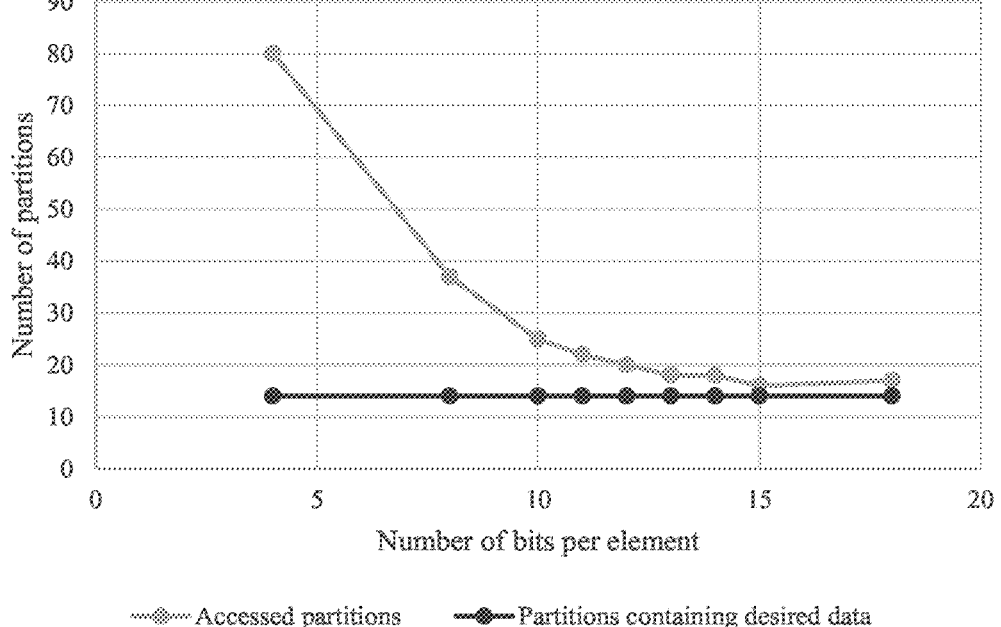
FIG. 3 shows an experiment example of presenting the total number of accessed partition and the number of partitions containing the desired data versus the number of bits per element of a Bloom filter.

According to the implementations, the size of the Bloom filter (i.e., the size of the underlying bit array) determines the optimal number of hash functions that the Bloom filter should employ to minimize the probability of false positives. The wrong number of hash functions augments the probability of false positives. Additionally, using too many hash functions reduces the performance of read operations. In practice, according to a well-known formula (cf. en.wikipedia.org/wiki/Bloom_filter), the optimal number of necessary hash functions is equal to ln(2) times the number of bits per element in the Bloom filter. Such an optimal number is experimentally determined in FIG. 3, which shows that in examples of the implementations 15 bits per element and 15*ln(2) hash functions provides the best return on investment.

As discussed above, FIG. 3 presents an example of experimental data used to determine the number of bits per element. At 15 bits per element, the number of accessed partitions is not much higher than the number of partitions that actually needs to be read (around 10% higher). Having more bits per element does not improve this by much. This size of 15 bits per entry is around 7% of the size of the partition itself in the most space-efficient format of the implementations, and less than 0.1% the size of the corresponding raw TTL file.

Examples of the implementations may apply a finer tuning by experimentally choosing a different number of bits per elements for the subject, object, and predicate Bloom filters.

Summary File Structure

According to the implementations, the summary file stores the complete data for one summary. The data comprises the Bloom filters, any metadata, and all the information needed to retrieve the hash functions. An example layout of the summary file is now discussed.

The summary file has 3 main sections: the header, the position array, and the Bloom filter buffer. The Bloom filter buffer is the concatenation of all Bloom filters in the summary file. The position array provides the position of each Bloom filter in the buffer and the position of total size of the Bloom filter buffer. The metadata contained in the header refer to individual Bloom filters by their position in the position array; for example, if the position array contains 4 entries [0; 544; 832; 2112; 2144] then the summary contains four Bloom filters, with:

Bloom filter 0 starting at position 0 in the Bloom filter buffer and ending at position 543
   Bloom filter 1 starting at position 544 and ending at position 831
   Bloom filter 2 starting at position 832 and ending at position 2111
   and Bloom filter 3 starting at position 2112 and ending at position 2143.

The length of each Bloom filter is trivially deducible from its starting and ending positions.

The header contains, in order:

global metadata: in particular, the version of the file, the number of predicates in the summary, the number of types in the summary, the number of hash functions used to read or writes the Bloom filters;

hash information for predicate and type Bloom filters. This information encodes how many, and which, hash functions (as defined in en.wikipedia.org/wiki/Hash-_function) where used to create the Bloom filters and is required to read the Bloom filters. Examples of the implementations uses a single hash algorithm with several different salts (i.e., small strings that are concatenated with the entry to hash just before hashing, cf. en.wikipedia.org/wiki/Salt_(cryptography)) to provide several hash functions.

Therefore it is sufficient to persist the number of hash functions and the salt of each hash function;

a table of each predicate containing the name of the predicate, the index of the Bloom filter corresponding to this predicate, and metadata for the predicate (as discussed above);
   the index of the "subject blank nodes" Bloom filters;
   a table of each type containing the name of the type, the index of the object Bloom filter corresponding to this type, and the metadata for this type (as discussed above).

Partial Read of a Summary File

In examples of the implementations, an optimization may be applied to reduce IO and memory. The largest part of a summary file is the Bloom filter buffer. On a typical dataset, the number of subjects and objects is several orders of magnitudes larger than the number of predicates and types. Therefore, the header and the position array sections of the summary file typically have a fraction of the size of the total file. As an optimization of both IO and memory usage, summary files need not be loaded in their entirety by the query engine.

According to such examples, the query engine loads the header and the position array of the summary files in all cases. When it needs to query one of the Bloom filters, the query engine finds the position of the Bloom filter in the position array and loads the Bloom filter in memory. Additionally, since a Bloom filter has a high chance of being read several times (during a single query execution, but also across queries), the implementations devote some form of cache system to keep a number of frequently used Bloom filters in (e.g., fastest available) memory if memory is available. The implementations achieve this by memory-mapping the file and letting the OS cache pages in RAM when available.

Such implementations provide a distributed query engine that does not need to access all of its partitions during a query without imposing any partitioning scheme.

The invention claimed is:

1. A computer-implemented method for generating a summary of a graph database comprising a set of RDF tuples, the method comprising:

obtaining the graph database; and generating a probabilistic extract of information of the graph database including:

a set of probabilistic filters, each probabilistic filter of the set determining if at least one RDF tuple, existing in the graph database, corresponds to a respective basic graph pattern of the probabilistic filter with a possibility of false positive and with no false negative, metadata defining a role for each probabilistic filter of the set, and a value indicating a respective number of RDF tuples in the graph database for each predicate, thereby obtaining the summary of the graph database.

2. The method of claim 1, wherein the set of probabilistic filters comprises, for each predicate (P) of the set of RDF tuples:

a first filter corresponding to a first basic graph pattern ((S, P, ?O)) which comprises the predicate and any subject in the set of RDF tuples; and/or a second filter corresponding to a second basic graph pattern ((?S, P, O)) which comprises the predicate and any object in the set of RDF tuples.

3. The method of claim 1, wherein the set of probabilistic filters comprises:

for each predicate (P) of the set of RDF tuples, a third filter corresponding to a third basic graph pattern which comprises the predicate and any subject and/or object in the set of RDF tuples.

4. The method of claim 3, wherein the subjects and/or objects are of type of URI.

5. The method of claim 3, wherein the set of probabilistic filters comprises:

for each non-URI type of respective objects in the graph database, a fourth filter corresponding to a fourth basic graph pattern ((?S, ?P, O)) which includes said respective objects.

6. The method of claim 3, wherein the set of probabilistic filters comprises:

a fifth filter corresponding to a fifth basic graph ((S, ?P, ?O)) pattern which comprises a blank node as subject.

7. The method of claim 1, wherein the set of probabilistic filters comprises:

for each non-URI type of respective objects in the graph database, a fourth filter corresponding to a fourth basic graph pattern ((?S, ?P, O)) which includes said respective objects.

8. The method of claim 7, wherein the set of probabilistic filters comprises:

a fifth filter corresponding to a fifth basic graph ((S, ?P, ?O)) pattern which comprises a blank node as subject.

9. The method of claim 1, wherein the set of probabilistic filters comprises:

a fifth filter corresponding to a fifth basic graph ((S, ?P, ?O)) pattern which comprises a blank node as subject.

10. The method of claim 1, wherein each probabilistic filter of the set comprises:

an array of a first size, and one or more hash functions, and wherein each probabilistic filter is configured to determine if at least one RDF tuple, existing in the graph database, corresponds to the respective basic graph pattern of the probabilistic filter by:

inputting each RDF tuple of the graph database to each hash function of the probabilistic filter to obtain a respective output of a second size, and storing the respective output in the array.

11. The method of claim 10, wherein a number of the one or more hash functions is based on the second size or is proportional to the second size.

12. The method of claim 10, wherein a number of the one or more hash functions is based on the second size or is proportional to the second size, wherein more preferably the second size is between 10 to 18 bits, and even more preferably the second size is 15 bits.

13. The method of claim 1, wherein the graph database is a partitioned graph database having a set of partitions, and the generating further comprises generating a probabilistic extract of information for each partition of the partitioned graph database.

14. The method of claim 13, further comprising, after identifying one or more partitions and prior to executing a received query on the identified one or more partitions of the set:

determining whether or not, for a basic graph pattern of the set of basic graph patterns, the identified one or more partitions form an empty set; and optimizing a respective query plan of the received query by removing the basic graph pattern from the set of basic graph patterns when the identified one or more partitions form an empty set.

15. A computer-implemented method of applying a set of summaries of a partitioned graph database, the method comprising:

obtaining a partitioned graph database and a generated set of summaries of the partitioned graph database;

receiving, by the partitioned graph database, a query having one or more basic graph patterns;

for each basic graph pattern, identifying one or more partitions of the set of partitions based on the generated set of summaries, wherein the one or more partitions comprise all RDF tuples of the obtained partitioned graph database that answer the query; and executing the received query on the identified one or more partitions of the set, wherein the partitioned graph database is generated by generating a summary of a graph database having a set of RDF tuples including:

obtaining the graph database, and generating a probabilistic extract of information of the graph database including:

a set of probabilistic filters, each probabilistic filter of the set determining if at least one RDF tuple, existing in the graph database, corresponds to a respective basic graph pattern of the probabilistic filter with a possibility of false positive and with no false negative, metadata defining a role for each probabilistic filter of the set, and a value indicating a respective number of RDF tuples in the graph database for each predicate, thereby obtaining the summary of the graph database, wherein the graph database is a partitioned graph database having a set of partitions, and wherein the generating further includes generating a probabilistic extract of information for each partition of the partitioned graph database.

16. The method of claim 15, wherein the identifying of one or more partitions of the set of partitions based on the generated set of summaries further comprises:

for each summary of the generated set of summaries, determining, by each filter of the set of probabilistic filters of the summary, if at least one RDF tuple, existing in the partition of the summary, corresponds to the respective basic graph pattern of the probabilistic filter.

17. The method of claim 15, further comprising, after identifying one or more partitions and prior to executing the received query on the identified one or more partitions of the set:

determining whether or not, for a basic graph pattern of the set of basic graph patterns, the identified one or more partitions form an empty set; and optimizing a respective query plan of the received query by removing the basic graph pattern from the set of basic graph patterns when the identified one or more partitions form an empty set.

18. A non-transitory computer readable storage medium having recorded thereon a computer program that when executed by a computer causes the computer to implement the method of claim 1.

19. A system comprising:

a processor coupled to a memory, the memory having recorded thereon instructions for generating a summary of a graph database having a set of RDF tuples that when executed by the processor cause the processor be configured to:

obtain the graph database, and generate a probabilistic extract of information of the graph database including:

a set of probabilistic filters, each probabilistic filter of the set determining if at least one RDF tuple, existing in the graph database, corresponds to a respective basic graph pattern of the probabilistic filter with a possibility of false positive and with no false negative, metadata defining a role for each probabilistic filter of the set, and a value indicating a respective number of RDF tuples in the graph database for each predicate, thereby obtaining the summary of the graph database.

* * * * *